(12) United States Patent
Yang et al.

(10) Patent No.: US 11,194,863 B2
(45) Date of Patent: Dec. 7, 2021

(54) SEARCHING METHOD AND APPARATUS, DEVICE AND NON-VOLATILE COMPUTER STORAGE MEDIUM

(71) Applicant: Beijing Baidu Netcom Science and Technology Co., Ltd., Beijing (CN)

(72) Inventors: Weidong Yang, Beijing (CN); Mengyang Liu, Beijing (CN); Hua Lu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 368 days.

(21) Appl. No.: 16/306,893

(22) PCT Filed: Aug. 25, 2016

(86) PCT No.: PCT/CN2016/096652
§ 371 (c)(1),
(2) Date: Dec. 3, 2018

(87) PCT Pub. No.: WO2017/206376
PCT Pub. Date: Dec. 7, 2017

(65) Prior Publication Data
US 2021/0056139 A1 Feb. 25, 2021

(30) Foreign Application Priority Data
Jun. 1, 2016 (CN) .......................... 201610383813.2

(51) Int. Cl.
*G06F 17/30* (2006.01)
*G06F 16/9032* (2019.01)
(Continued)

(52) U.S. Cl.
CPC ...... *G06F 16/9032* (2019.01); *G06F 16/9038* (2019.01); *G06F 16/90335* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 8,650,031 B1 * 2/2014 Mamou .................. G10L 15/26
704/235
8,949,107 B1 * 2/2015 Bhagat .................. G06F 16/951
704/8

(Continued)

FOREIGN PATENT DOCUMENTS

CN 102053977 A 5/2011
CN 103077218 5/2013

(Continued)

OTHER PUBLICATIONS

International Search Report for PCT /CN2016/096652 dated Feb. 23, 2017 and its English translation provided by WIPO.

(Continued)

*Primary Examiner* — Hung D Le
(74) *Attorney, Agent, or Firm* — Ladas & Parry, LLP

(57) ABSTRACT

The present disclosure provides a searching method and apparatus, a device and a non-volatile computer storage medium. According to embodiments of the present disclosure, it is possible to obtain a search intention according to the obtained query keyword, and then obtain at least one scenario detail according to the search intention, so that it is possible to output the at least one scenario detail. Since the same search intention might correspond to different scenario demands, directly providing the user with several scenario details corresponding to the search intention can effectively meet differentiated demands when the user uses the same query keyword to search under different scenarios.

12 Claims, 3 Drawing Sheets

(51) Int. Cl.
*G06F 16/903* (2019.01)
*G06F 16/9038* (2019.01)

(56) References Cited

U.S. PATENT DOCUMENTS

| | | | |
|---|---|---|---|
| 2008/0109422 A1 | 5/2008 | Dedhia | |
| 2011/0295840 A1* | 12/2011 | Ciaramita | G06F 16/2453 707/719 |
| 2011/0302172 A1* | 12/2011 | Chandrasekar | G06F 16/3338 707/748 |
| 2012/0158685 A1* | 6/2012 | White | G06F 16/9535 707/706 |
| 2012/0203772 A1* | 8/2012 | Cucerzan | G06F 16/3338 707/723 |
| 2013/0060761 A1* | 3/2013 | Hoad | G06F 16/951 707/723 |
| 2013/0282727 A1* | 10/2013 | Muraoka | G06F 40/30 707/740 |
| 2015/0278355 A1* | 10/2015 | Hassanpour | G06F 16/951 707/706 |
| 2015/0294010 A1 | 10/2015 | Wang et al. | |
| 2016/0005196 A1* | 1/2016 | Awadallah | G06F 16/3322 345/440 |
| 2016/0063110 A1* | 3/2016 | Shoup | G06F 3/04842 707/706 |
| 2016/0142787 A1* | 5/2016 | Mohamed | H04L 63/0861 725/53 |

FOREIGN PATENT DOCUMENTS

| | | |
|---|---|---|
| CN | 103455576 A | 12/2013 |
| CN | 103699625 A | 4/2014 |
| CN | 103914554 A | 7/2014 |
| CN | 104142990 A | 11/2014 |
| CN | 104462553 | 3/2015 |

OTHER PUBLICATIONS

Written Opinion of the International Search Authority for PCT /CN2016/096652 dated Feb. 23, 2017 and its English translation provided by WIPO.
First Office action and translation for related Chinese Application 2016103838132 provided by Google Translate.

* cited by examiner

SEARCHING METHOD AND APPARATUS, DEVICE AND NON-VOLATILE COMPUTER STORAGE MEDIUM

CROSS-REFERENCE TO RELATED APPLICATIONS

The present disclosure application is the U.S. national phase of PCT Application PCT/CN2016/096652 filed on Aug. 25, 2016, which claims priority to the Chinese patent application No. 201610383813.2 entitled "Searching Method and Apparatus" filed on Jun. 1, 2016, the entire disclosures of which are hereby incorporated by reference in their entireties.

FIELD OF THE DISCLOSURE

The present disclosure relates to Internet technologies, and particularly to a searching method and apparatus, a device and a non-volatile computer storage medium.

BACKGROUND OF THE DISCLOSURE

A search engine is a system of collecting information from the Internet using a specific computer program according to a certain policy, providing the user with searching service after organizing and processing information, and displaying information related to the user's search to the user. According to reports of State Statistics Bureau, the number of China's netizens already exceeds 400 million. The data means that China already becomes the world's largest netizen country beyond the United States, and a total number of China's websites already exceeds 2 million. Hence, how to use searching service to meet users' demands to a maximum degree is always an important subject for internet enterprises. When different users use the same query keyword to search, information desired by them might vary. Even the same user might desire to obtain different information under different scenarios.

Therefore, it is desirable to provide a searching method to meet differentiated demands when the user uses the same query keyword to search under different scenarios.

SUMMARY OF THE DISCLOSURE

A plurality of aspects of the present disclosure provide a searching method and apparatus, a device and a non-volatile computer storage medium, to meet differentiated demands when the user uses the same query keyword to search under different scenarios.

According to an aspect of the present disclosure, there is provided a searching method, comprising:
 obtaining a query keyword;
 obtaining a search intention according to the query keyword;
 obtaining at least one scenario detail according to the search intention;
 outputting the at least one scenario detail.

The above aspect and any possible implementation mode further provide an implementation mode: before obtaining a search intention according to the query keyword, the method further comprises:
 obtaining a co-occurring query keyword sequence according to the user's historical behavior data;
 performing aggregation processing for the co-occurring query keyword sequence to obtain at least one query keyword class;
 according to said at least one query keyword class, obtaining a search intention of each query keyword class in said at least one query keyword class and at least one scenario detail corresponding to the search intention.

The above aspect and any possible implementation mode further provide an implementation mode: before obtaining a search intention according to the query keyword, the method further comprises:
 obtaining click entropies of historical query keywords according to user historical behavior data;
 according to the click entropies of the historical query keywords, selecting partial historical query keywords or all historical query keywords, as target query keywords;
 performing classification processing for the target query keywords to obtain at least one query keyword class;
 according to said at least one query keyword class, obtaining a search intention of each query keyword class in said at least one query keyword class and at least one scenario detail corresponding to the search intention.

The above aspect and any possible implementation mode further provide an implementation mode: after obtaining click entropies of historical query keywords according to user historical behavior data, the method further comprises:
 using beta distribution to calculate a confidence of the click entropies of the historical query keywords;
 according to the confidence of the click entropies of the historical query keywords, filtering the historical query keywords to obtain believable click entropies of the historical query keywords.

The above aspect and any possible implementation mode further provide an implementation mode: the method further comprises:
 performing comparison processing for at least one scenario detail corresponding to the search intention obtained according to the co-occurring query keyword sequence, and at least one scenario detail corresponding to the search intention obtained according to the click entropies of the historical query keywords, to obtain overlapping partial scenario details;
 taking said overlapping partial scenario details as at least one scenario detail corresponding to the search intention.

The above aspect and any possible implementation mode further provide an implementation mode: the outputting the at least one scenario detail comprises:
 obtaining a popularity of access to each scenario detail in said at least one scenario detail; and
 according to the popularity of access to said each scenario detail, outputting said at least one scenario detail in a designated area in a search result page.

According to another aspect of the present disclosure, there is provided a searching apparatus, comprising:
 an obtaining unit configured to obtain a query keyword;
 an intention unit configured to obtain a search intention according to the query keyword;
 a detail unit configured to obtain at least one scenario detail according to the search intention;
 an output unit configured to output the at least one scenario detail.

The above aspect and any possible implementation mode further provide an implementation mode: the apparatus further comprises a first analysis unit which is configured to
 obtain a co-occurring query keyword sequence according to the user's historical behavior data;
 perform aggregation processing for the co-occurring query keyword sequence to obtain at least one query keyword class; and according to said at least one query keyword class, obtain a search intention of each query keyword class in said at least one query keyword class and at least one scenario detail corresponding to the search intention.

The above aspect and any possible implementation mode further provide an implementation mode: the apparatus further comprises a second analysis unit which is configured to obtain click entropies of historical query keywords according to user historical behavior data;

according to the click entropies of the historical query keywords, select partial historical query keywords or all historical query keywords, as target query keywords;

perform classification processing for the target query keywords to obtain at least one query keyword class; and according to said at least one query keyword class, obtain a search intention of each query keyword class in said at least one query keyword class and at least one scenario detail corresponding to the search intention.

The above aspect and any possible implementation mode further provide an implementation mode: the second analysis unit is further configured to use beta distribution to calculate a confidence of the click entropies of the historical query keywords; and according to the confidence of the click entropies of the historical query keywords, filter the historical query keywords to obtain believable click entropies of the historical query keywords.

The above aspect and any possible implementation mode further provide an implementation mode: the apparatus further comprises a decision-making unit which is configured to perform comparison processing for at least one scenario detail corresponding to the search intention obtained according to the co-occurring query keyword sequence, and at least one scenario detail corresponding to the search intention obtained according to the click entropies of the historical query keywords, to obtain overlapping partial scenario details; and take said overlapping partial scenario details as at least one scenario detail corresponding to the search intention.

The above aspect and any possible implementation mode further provide an implementation mode: the output unit is specifically configured to obtain a popularity of access to each scenario detail in said at least one scenario detail; and according to the popularity of access to said each scenario detail, output said at least one scenario detail in a designated area in a search result page.

According to a further aspect of the present disclosure, there is provided a device, comprising one or more processors;

a memory;

one or more programs stored in the memory and configured to execute the following operations when executed by the one or more processors:

obtaining a query keyword;

obtaining a search intention according to the query keyword;

obtaining at least one scenario detail according to the search intention;

outputting the at least one scenario detail.

According to a further aspect of the present disclosure, there is provided a non-volatile computer storage medium in which one or more programs are stored, an apparatus being enabled to execute the following operations when said one or more programs are executed by the apparatus:

obtaining a query keyword;

obtaining a search intention according to the query keyword;

obtaining at least one scenario detail according to the search intention;

outputting the at least one scenario detail.

As known from the above technical solutions, according to embodiments of the present disclosure, it is possible to obtain a search intention according to the obtained query keyword, and then obtain at least one scenario detail according to the search intention, so that it is possible to output the at least one scenario detail. Since the same search intention might correspond to different scenario demands, directly providing the user with several scenario details corresponding to the search intention can effectively meet differentiated demands when the user uses the same query keyword to search under different scenarios.

In addition, according to the technical solutions of the present disclosure, it is possible to output, in the designated area in the search result page, at least one scenario detail corresponding to the obtained search intention, so that the user can directly find, from the search result page, content meeting his scenario demands for browsing, and can effectively improve the searching efficiency.

In addition, the technical solutions of the present disclosure can be employed to effectively improve the user's experience.

BRIEF DESCRIPTION OF DRAWINGS

To describe technical solutions of embodiments of the present disclosure mom clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
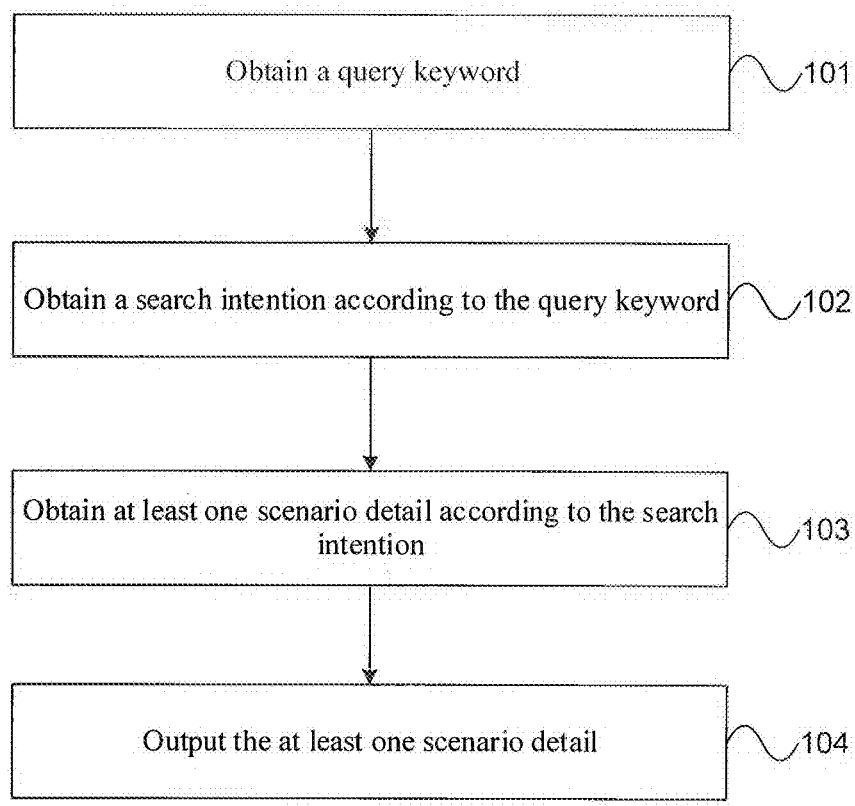
FIG. 1 is a flow chart of a searching method according to an embodiment of the present disclosure.

FIG. 1 is a flow chart of a searching method according to an embodiment of the present disclosure. As shown in FIG. 1, the method comprises the following steps:

101: obtaining a query keyword.

102: obtaining a search intention according to the query keyword.

103: obtaining at least one scenario detail according to the search intention.

104: outputting the at least one scenario detail.

It needs to be appreciated that part or all of subjects for executing 101-104 may be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

As such, it is possible to obtain a search intention according to the obtained query keyword, and then obtain at least one scenario detail according to the search intention, so that it is possible to output the at least one scenario detail. Since the same search intention might correspond to different scenario demands, directly providing the user with several scenario details corresponding to the search intention can effectively meet differentiated demands when the user uses the same query keyword to search under different scenarios.

Optionally, in a possible implementation mode of the present embodiment, in 101, it is specifically possible to collect the query keyword provided by the user. Specifically, it is possible to implement this through a search command triggered by the user. It is specifically possible to trigger the search command in the following two manners:

Manner 1:

The user may input the query keyword on a page displayed on the current application, and then trigger the search command by clicking a search button such as Baidu on the page. The search command includes the query keyword. The user may input the query keyword in any order. As such, it is possible to, after receiving the search command, parse to obtain the query keyword included therein.

Manner 2:

Input content input by the user on the page displayed by the current application is obtained in real time by employing asynchronous loading technologies such as Ajax asynchronous loading or Jsonp asynchronous loading. The input content at this time may be called input keyword to differ from the query keyword. The user may input the query keyword in any order. Specifically, it is possible to provide an interface such as an Ajax interface or Jsonp interface. These interfaces may be written in a language such as Java, Hypertext Preprocesor (PHP) language. Its specific invocation may be written in a language such as Jquery keyword, or native JavaScript.

It is possible to perform subsequent operations 102-104 after obtaining the input keyword.

Optionally, in a possible implementation mode of the present embodiment, before 102, it is possible to further mine search intentions of some query keywords, and at least one scenario detail corresponding to the search intentions.

In a specific implementation process, it is specifically possible to obtain a co-occurring query keyword sequence according to the user's historical behavior data, and then perform aggregation processing for the co-occurring query keyword sequence to obtain at least one query keyword class. Then, it is possible to, according to said at least one query keyword class, obtain a search intention of each query keyword class in said at least one query keyword class, such as travelling to a certain place, and at least one scenario detail corresponding to the search intention, for example, shopping scenario detail, hotel scenario detail and scenic spot scenario detail.

In another specific implementation process, it is specifically possible to obtain click entropies of historical query keywords according to user historical behavior data, and then, according to the click entropies of the historical query keywords, select partial historical query keywords or all historical query keywords, as target query keywords. Then, it is possible to perform classification processing for the target query keywords to obtain at least one query keyword class, and according to said at least one query keyword class, obtain a search intention of each query keyword class in said at least one query keyword class and at least one scenario detail corresponding to the search intention.

The so-called click entropy of the query keyword refers to an index for measuring differences of click situations of search results of the query keyword.

Specifically, it is possible to, after obtaining the click entropies of the historical query keywords, further use beta distribution to calculate a confidence of the click entropies of the historical query keywords. Then, it is possible to, according to the confidence of the click entropies of the historical query keywords, filter the historical query keywords to obtain believable click entropies of the historical query keywords. As such, it is possible to effectively filter away unbelievable click entropies of the historical query keywords, and take remaining click entropies of the historical query keywords, as a basis for selecting target query keywords. For example, it is possible to preset a confidence threshold, and if the confidence of the click entropies of the historical query keywords is larger than or equal to the confidence threshold, retain and use the click entropies of the historical query keywords as a basis for selecting target query keywords; otherwise, if the obtained confidence of the click entropies of the historical query keywords is smaller than the confidence threshold, it is necessary to delete the click entropies of the historical query keywords, and not to use them as a basis for selecting target query keywords.

In this implementation mode, the basis for selecting target query keywords may be selecting historical query keywords whose click entropies are larger than or equal to a preset click entropy threshold, as target query keywords, or selecting a designated number of historical query keywords with the largest click entropies, as the target query keywords. This is not particularly limited by the present embodiment.

In another specific implementation process, it is possible to obtain at least one scenario detail corresponding to a designated search intention, in conjunction with the results obtained in the above two specific implementation processes. Specifically, it is possible to perform comparison processing for at least one scenario detail corresponding to the search intention obtained according to co-occurring query keyword sequence, and at least one scenario detail corresponding to the search intention obtained according to the click entropies of the historical query keywords, to obtain overlapping partial scenario details, and then it is possible to take said overlapping partial scenario details as at least one scenario detail corresponding to the search intention.

After mining the search intentions of some query keywords and at least one scenario detail corresponding to the search intentions, it is further possible to perform storage processing for a mapping relationship of the mined search intentions of the query keywords and at least one scenario detail corresponding to the search intentions. Specifically, it is possible to store the mapping relationship in a storage device of the terminal.

In a specific implementation process, the storage device of the terminal may be a slow-speed storage device, and may specifically be a hard disk of a computer system, or may be a non-running memory of a mobile phone, namely, a physical memory, for example, a Read-Only Memory (ROM) and a memory card. This is not particularly limited in the present embodiment.

In another specific implementation process, the storage device of the terminal may further be a fast-speed storage device, and may specifically be a memory of a computer system, or may further be a running memory of a mobile phone, namely, a system memory, for example, a Random Access Memory (RAM). This is not particularly limited in the present embodiment.

As such, after obtaining the query keyword, it is possible to obtain the search intention and at least one scenario detail corresponding to the search intention, according to the stored mapping relationship.

Optionally, in a possible implementation mode of the present embodiment, in 104, it is specifically possible to obtain a popularity of access to each scenario detail in said at least one scenario detail, and then according to the popularity of access to said each scenario detail, output said at least one scenario detail in a designated area in a search result page, for example, an uppermost portion in the search result page.

Specifically, it is possible to output said at least one scenario detail in the designated area in the search result page, in a descending order of the popularity of access.

In a specific implementation process, the popularity of access to the scenario detail may depend on situations of access to the scenario such as a click rate, or may depend on subjective activities of the scenario such as promotional activities such as promotional activities of hotels at a designated place. This is not particularly limited in the present embodiment.

In the present embodiment, it is possible to obtain a search intention according to the obtained query keyword, and then obtain at least one scenario detail according to the search intention, so that it is possible to output the at least one scenario detail. Since the same search intention might correspond to different scenario demands, directly providing the user with several scenario details corresponding to the search intention can effectively meet differentiated demands when the user uses the same query keyword to search under different scenarios.

In addition, according to the technical solution of the present disclosure, it is possible to output, in the designated area in the search result page, at least one scenario detail corresponding to the obtained search intention, so that the user can directly find, from the search result page, content meeting his scenario demands for browsing, and can effectively improve the searching efficiency.

In addition, the technical solution of the present disclosure can be employed to effectively improve the user's experience.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
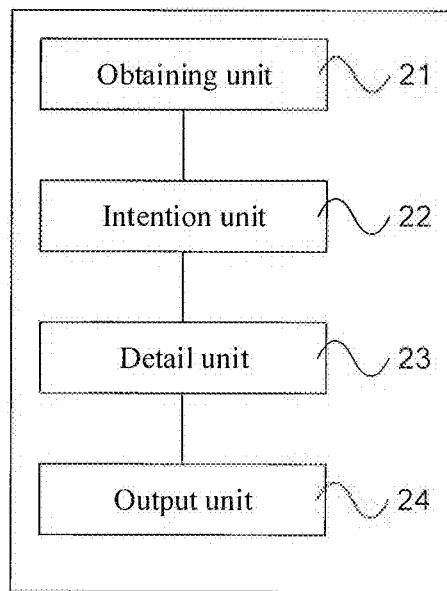
FIG. 2 is a block diagram of a searching apparatus according to another embodiment of the present disclosure.

FIG. 2 is a block diagram of a searching apparatus according to another embodiment of the present disclosure. As shown in FIG. 2, the searching apparatus of the present embodiment may comprise an obtaining unit 21, an intention unit 22, a detail unit 23 and an output unit 24, wherein the obtaining unit 21 is configured to obtain a query keyword; the intention unit 22 is configured to obtain a search intention according to the query keyword; the detail unit 23 is configured to obtain at least one scenario detail according to the search intention; the output unit 24 is configured to output the at least one scenario detail.

It needs to be appreciated that part or all of the searching apparatus according to the present embodiment may be an application located in a local terminal, or a function unit such as a plug-in or Software Development Kit (SDK) located in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

Figure 3:
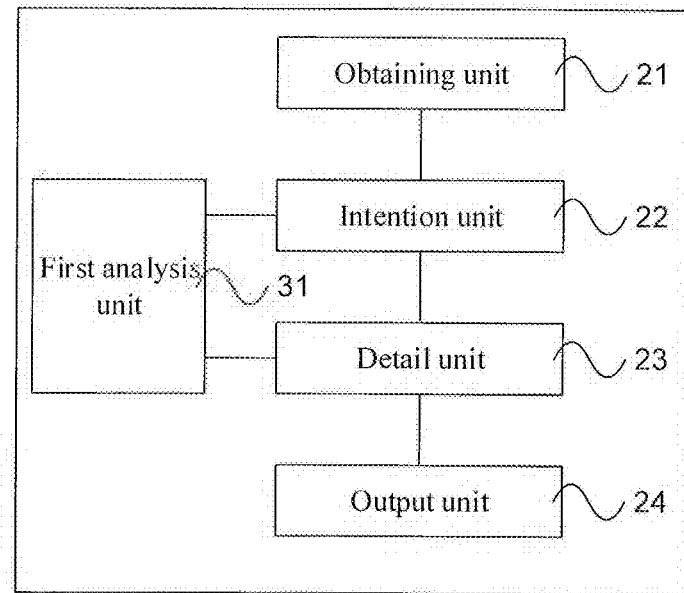
FIG. 3 is a block diagram of a searching apparatus according to a further embodiment of the present disclosure.

Optionally, in a possible implementation mode of the present embodiment, as shown in FIG. 3, the searching apparatus according to the present embodiment may further comprise a first analysis unit 31 which is configured to obtain a co-occurring query keyword sequence according to the user's historical behavior data, and then perform aggregation processing for the co-occurring query keyword sequence to obtain at least one query keyword class; and according to said at least one query keyword class, obtain a search intention of each query keyword class in said at least one query keyword class and at least one scenario detail corresponding to the search intention.

Figure 4:
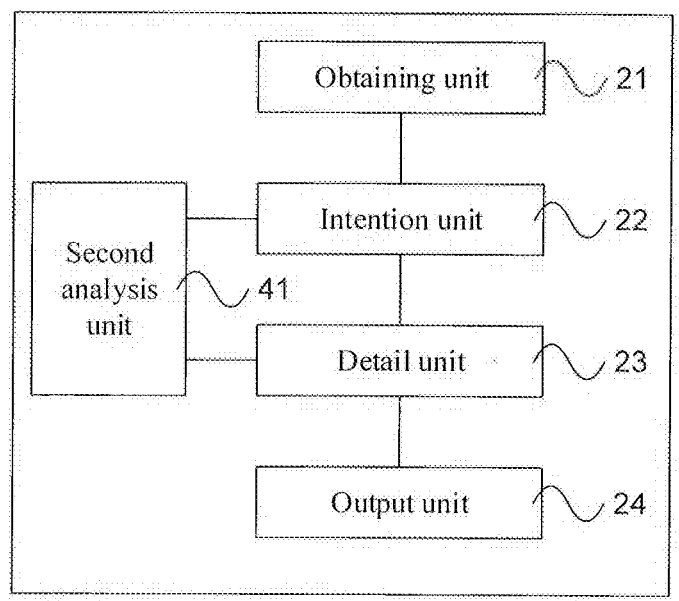
FIG. 4 is a block diagram of a searching apparatus according to a further embodiment of the present disclosure.

Optionally, in a possible implementation mode of the present embodiment, as shown in FIG. 4, the searching apparatus according to the present embodiment may further comprise a second analysis unit 41 which is configured to obtain click entropies of historical query keywords according to user historical behavior data; according to the click entropies of the historical query keywords, select partial historical query keywords or all historical query keywords, as target query keywords; perform classification processing for the target query keywords to obtain at least one query keyword class; and according to said at least one query keyword class, obtain a search intention of each query keyword class in said at least one query keyword class and at least one scenario detail corresponding to the search intention.

In a specific implementation process, the second analysis unit 41 is further configured to use beta distribution to calculate a confidence of the click entropies of the historical query keywords; and, according to the confidence of the click entropies of the historical query keywords, filter the historical query keywords to obtain believable click entropies of the historical query keywords.

Figure 5:
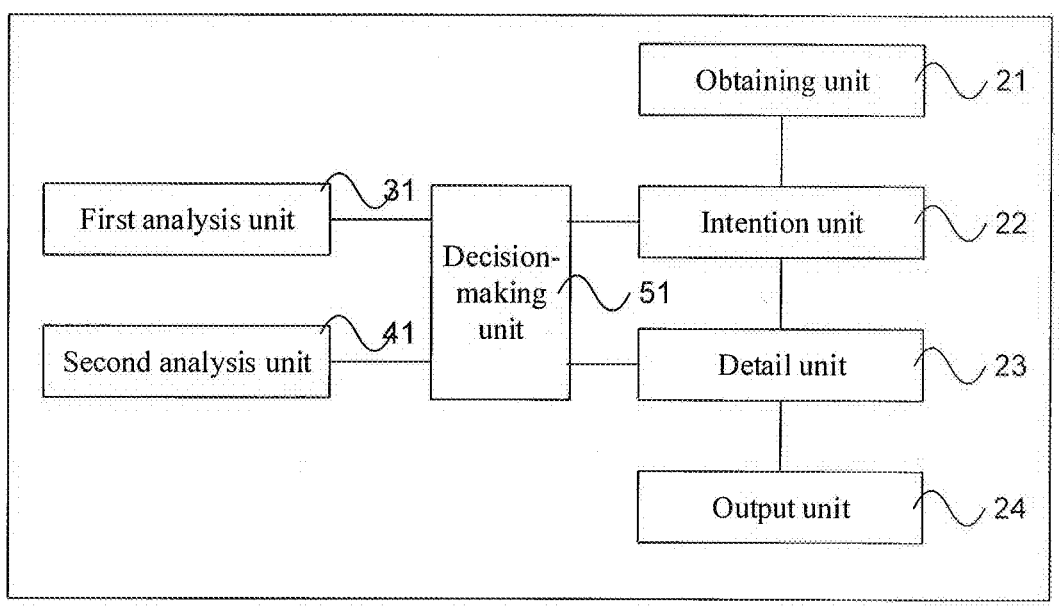
FIG. 5 is a block diagram of a searching apparatus according to a further embodiment of the present disclosure.

Optionally, in a possible implementation mode of the present embodiment, as shown in FIG. 5, the searching apparatus according to the present embodiment may further comprise a decision-making unit 51 which is configured to perform comparison processing for at least one scenario detail corresponding to the search intention obtained according to the co-occurring query keyword sequence, and at least one scenario detail corresponding to the search intention obtained according to the click entropies of the historical query keywords, to obtain overlapping partial scenario details; and take said overlapping partial scenario details as at least one scenario detail corresponding to the search intention.

Optionally, in a possible implementation mode of the present embodiment, the output unit 24 is specifically configured to obtain a popularity of access to each scenario detail in said at least one scenario detail; and then according to the popularity of access to said each scenario detail, output said at least one scenario detail in a designated area in a search result page.

It needs to be appreciated that the method in the embodiment corresponding to FIG. 1 may be implemented by the searching apparatus according to the present embodiment. Reference may be made to relevant content in the embodiment corresponding to FIG. 1 for detailed description, which will not be detailed any longer here.

In the present embodiment, the intention unit obtains a search intention according to the query keyword obtained by the obtaining unit, and then the detail unit obtains at least one scenario detail according to the search intention, so that the output unit outputs the at least one scenario detail. Since the same search intention might correspond to different scenario demands, directly providing the user with several scenario details corresponding to the search intention can effectively meet differentiated demands when the user uses the same query keyword to search under different scenarios.

In addition, according to the technical solution of the present disclosure, it is possible to output, in the designated area in the search result page, at least one scenario detail corresponding to the obtained search intention, so that the user can directly find, from the search result page, content meeting his scenario demands for browsing, and can effectively improve the searching efficiency.

In addition, the technical solution of the present disclosure can be employed to effectively improve the user's experience.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:
1. A searching method, comprising:
obtaining a query keyword;
obtaining a search intention according to the query keyword;
obtaining at least one scenario detail according to the search intention, the scenario detail indicating a scenario corresponding to the search intention;
outputting the at least one scenario detail,
wherein before obtaining a search intention according to the query keyword, the method further comprises:
obtaining click entropies of historical query keywords according to user historical behavior data, the entropy being an index for measuring differences of click situations of search results of the query keyword;

according to the click entropies of the historical query keywords, selecting partial historical query keywords or all historical query keywords, as target query keywords;

performing classification processing for the target query keywords to obtain at least one query keyword class;

according to said at least one query keyword class, obtaining a search intention of each query keyword class in said at least one query keyword class and at least one scenario detail corresponding to the search intention.

2. The method according to claim 1, wherein after obtaining click entropies of historical query keywords according to user historical behavior data, the method further comprises:

using beta distribution to calculate a confidence of the click entropies of the historical query keywords;

according to the confidence of the click entropies of the historical query keywords, filtering the historical query keywords to obtain believable click entropies of the historical query keywords.

3. The method according to claim 1, wherein the method further comprises:

performing comparison processing for at least one scenario detail corresponding to the search intention obtained according to the co-occurring query keyword sequence, and at least one scenario detail corresponding to the search intention obtained according to the click entropies of the historical query keywords, to obtain overlapping partial scenario details;

taking said overlapping partial scenario details as at least one scenario detail corresponding to the search intention.

4. The method according to claim 1, wherein the outputting the at least one scenario detail comprises:

obtaining a popularity of access to each scenario detail in said at least one scenario detail;

according to the popularity of access to said each scenario detail, outputting said at least one scenario detail in a designated area in a search result page.

5. A device, comprising
one or more processors;
a memory;
one or more programs stored in the memory and configured to implement a searching method when executed by the one or more processors, wherein the method comprises:
obtaining a query keyword;
obtaining a search intention according to the query keyword;
obtaining at least one scenario detail according to the search intention, the scenario detail indicating a scenario corresponding to the search intention;
outputting the at least one scenario detail,
wherein before obtaining a search intention according to the query keyword, the method further comprises:
obtaining click entropies of historical query keywords according to user historical behavior data, the entropy being an index for measuring differences of click situations of search results of the query keyword;
according to the click entropies of the historical query keywords, selecting partial historical query keywords or all historical query keywords, as target query keywords;
performing classification processing for the target query keywords to obtain at least one query keyword class;
according to said at least one query keyword class, obtaining a search intention of each query keyword class in said at least one query keyword class and at least one scenario detail corresponding to the search intention.

6. The device according to claim 5, wherein after obtaining click entropies of historical query keywords according to user historical behavior data, the method further comprises:

using beta distribution to calculate a confidence of the click entropies of the historical query keywords;

according to the confidence of the click entropies of the historical query keywords, filtering the historical query keywords to obtain believable click entropies of the historical query keywords.

7. The device according to claim 5, wherein the method further comprises:

performing comparison processing for at least one scenario detail corresponding to the search intention obtained according to the co-occurring query keyword sequence, and at least one scenario detail corresponding to the search intention obtained according to the click entropies of the historical query keywords, to obtain overlapping partial scenario details;

taking said overlapping partial scenario details as at least one scenario detail corresponding to the search intention.

8. The device according to claim 5, wherein the outputting the at least one scenario detail comprises:

obtaining a popularity of access to each scenario detail in said at least one scenario detail;

according to the popularity of access to said each scenario detail, outputting said at least one scenario detail in a designated area in a search result page.

9. A non-transitory computer storage medium in which one or more programs are stored, an apparatus being enabled to implement a searching method when said one or more programs are executed by the apparatus, wherein the method comprises:

obtaining a query keyword;
obtaining a search intention according to the query keyword;
obtaining at least one scenario detail according to the search intention, the scenario detail indicating a scenario corresponding to the search intention;
outputting the at least one scenario detail,
wherein before obtaining a search intention according to the query keyword, the method further comprises:
obtaining click entropies of historical query keywords according to user historical behavior data, the entropy being an index for measuring differences of click situations of search results of the query keyword;
according to the click entropies of the historical query keywords, selecting partial historical query keywords or all historical query keywords, as target query keywords;
performing classification processing for the target query keywords to obtain at least one query keyword class;
according to said at least one query keyword class, obtaining a search intention of each query keyword class in said at least one query keyword class and at least one scenario detail corresponding to the search intention.

10. The non-transitory computer storage medium according to claim 9, wherein after obtaining click entropies of historical query keywords according to user historical behavior data, the method further comprises:

using beta distribution to calculate a confidence of the click entropies of the historical query keywords;

according to the confidence of the click entropies of the historical query keywords, filtering the historical query keywords to obtain believable click entropies of the historical query keywords.

11. The non-transitory computer storage medium according to claim 9, wherein the method further comprises:
performing comparison processing for at least one scenario detail corresponding to the search intention obtained according to the co-occurring query keyword sequence, and at least one scenario detail corresponding to the search intention obtained according to the click entropies of the historical query keywords, to obtain overlapping partial scenario details;
taking said overlapping partial scenario details as at least one scenario detail corresponding to the search intention.

12. The non-transitory computer storage medium according to claim 9, wherein the outputting the at least one scenario detail comprises:
obtaining a popularity of access to each scenario detail in said at least one scenario detail;
according to the popularity of access to said each scenario detail, outputting said at least one scenario detail in a designated area in a search result page.

* * * * *